United States Patent [19]
Sundeen

[11] Patent Number: 5,445,575
[45] Date of Patent: Aug. 29, 1995

[54] IGNITION LOCK CYLINDER AND GEAR SHIFT LEVER INTERLOCK

[76] Inventor: Arthur R. Sundeen, 4405 Wagonwheel, Lansing, Mich. 48917

[21] Appl. No.: 236,051

[22] Filed: May 2, 1994

[51] Int. Cl.$^6$ .............................................. F16H 41/06
[52] U.S. Cl. ................................................ 477/99
[58] Field of Search ..................................... 477/99

[56] References Cited

U.S. PATENT DOCUMENTS 5,252,861  10/1993  Steeby et al. ..................... 477/99
5,289,907   3/1994  Pattock .............................. 477/99

Primary Examiner—Dirk Wright
Attorney, Agent, or Firm—Vincent A. Cichosz

[57] ABSTRACT

A gear shift lever and ignition lock cylinder are interlocked by a pair of independantly actuatable solenoids. Key removal from the ignition lock cylinder is prevented when the gear shift lever is not properly in a predetermined park position, and the gear shift lever, once properly in the predetermined park position, is inhibited from moving until the key removal is inhibited. Solenoid control is preferably by a programmable controller and logic.

7 Claims, 5 Drawing Sheets

FIG. 1.1

| CONTACTS<br>CYL POSITION | IGN0 | IGN1 | IGN2 |
|---|---|---|---|
| OFF/LOCK | 0 | 0 | 0 |
| ACC | 1 | 0 | 1 |
| RUN | 1 | 1 | 1 |
| CRANK | 1 | 1 | 1 |

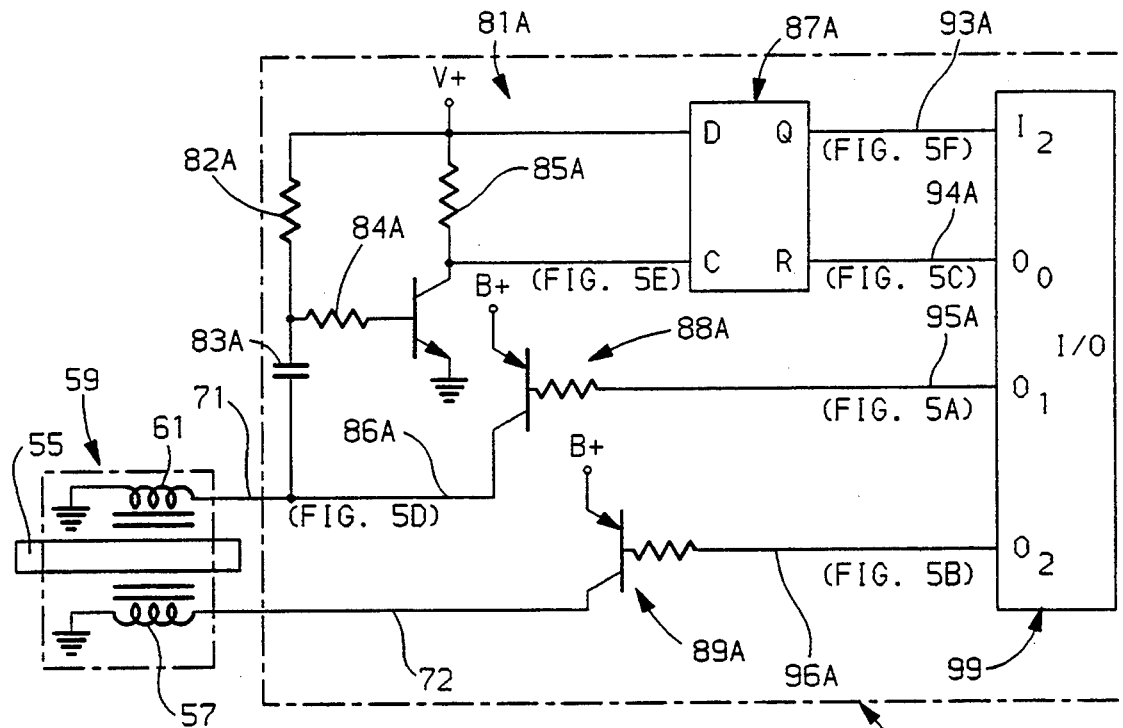
FIG. 4
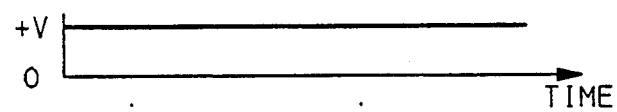
FIG. 5A
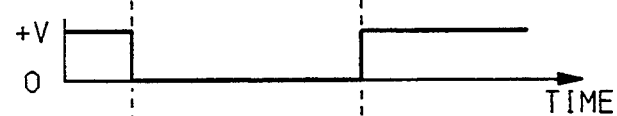
FIG. 5B
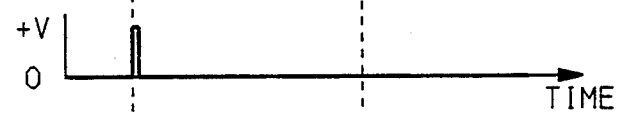
FIB. 5C
FIG. 5D
FIG. 5E
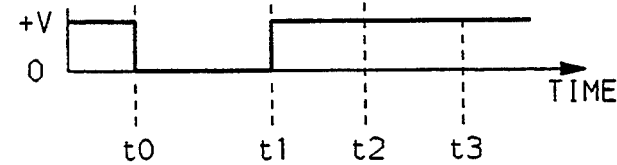
FIG. 5F

IGNITION LOCK CYLINDER AND GEAR SHIFT LEVER INTERLOCK

BACKGROUND OF THE INVENTION

This invention relates to motor vehicle ignition lock cylinder and gear shift lever interlock systems. More particularly, it relates to systems which inhibit the removal of the key from the ignition lock cylinder when the gear shift lever is out of a predetermined park position and which further inhibit the movement of the gear shift lever out of the predetermined park position unless the key is in the ignition lock cylinder and inhibited from removal.

Prior art systems are well known which perform these functions by mechanical means linking gear shift levers and ignition lock cylinders. Most modern day automobiles have an ignition lock cylinder mounted to the steering column and a column mounted shift gear shift lever or console mounted gear shift lever. Ignition lock cylinders commonly have an OFF/LOCK position whereat key insertion and removal are performed and the vehicle accessories and engine are not powered; a RUN position whereat key removal is inhibited and the vehicle accessories and engine are powered; and, an intermediate ACCESSORY position whereat key removal is inhibited and the vehicle accessories are powered but the vehicle engine is not.

Furthermore, mechanical linkages are widely used to inhibit gear shift lever movement out of a predetermined park position—park in automatic transmission equipped vehicles and reverse in manual transmission equipped vehicles—unless the ignition lock cylinder is out of the OFF/LOCK position and ignition key removal is inhibited. Also, the ignition lock cylinder is inhibited from returning to the OFF/LOCK position if the gear shift lever remains out of the predetermined park position thereby ensuring return to park position before ignition key removal and cylinder lock-up.

Column mounted gear shift lever equipped vehicles may employ a mechanical blocking means to inhibit shift lever movement out of the park position when the ignition lock cylinder is in the OFF/LOCK position or rotation of the ignition lock cylinder into the OFF/LOCK position when the shift lever is out of the park position. Other column mounted gear shift lever equipped vehicles may employ a flexible cable between the shift lever and a neutral start switch to electrically inhibit engine cranking when the shift lever is in not in the park or neutral position.

Console mounted gear shift lever equipped vehicles commonly employ a flexible cable between the shift lever and the ignition switch which is effective to cause mechanical inhibition of the ignition switch and ignition lock cylinder to the OFF/LOCK position when the gear shift lever is out of the predetermined park position. Likewise, when the ignition switch is in the OFF/LOCK position, the cable is inhibited and the shift lever is retained in the park position. An additional flexible cable is then also used between the shift lever and a neutral start switch to electrically inhibit engine cranking when the shift lever is in not in the park or neutral position.

SUMMARY OF THE INVENTION

The present invention is implemented in a motor vehicle having an ignition lock cylinder with a lock position, run position and an intermediate position therebetween such as commonly used for accessory powering. The invention is equally applicable to automatic or manual transmission equipped vehicles. The gear shift lever of a vehicle has a predetermined park position (park for automatic transmission and preferably reverse for manual transmission). The vehicle's ignition lock cylinder and gear shift lever interlock in such a way as to inhibit key removal when the gear shift lever is not in the park position and to further prevent gear shift lever movement out of park unless key removal is inhibited.

The system includes two mechanically independent lock-out means, one associated with each of the ignition lock cylinder and gear shift lever. The lockout means associated with the ignition lock cylinder is effective in two states, one to inhibit the lock cylinder from entering the lock position and the other to enable the lock cylinder to enter the lock position. The lock-out means associated with the gear shift lever is likewise effective in two states, one to inhibit the gear shift lever from exiting the park position and the other to enable the gear shift lever to exit the park position.

According to one aspect of the present invention, the system lock-out means are responsive to the ignition lock cylinder in the run position to inhibit key removal by preventing the return of the ignition lock cylinder to the OFF/LOCK position and to enable the gear shift lever lock-out means to be moved out of the park position. According to another aspect of the invention, the system lock-out means are responsive to the ignition lock cylinder in the intermediate position to inhibit movement of the gear shift lever out of the park position and to enable the ignition lock cylinder to return to the OFF/LOCK position thereby allowing the key to be removed.

BRIEF DESCRIPTION OF THE DRAWINGS

FIG. 3 is a graphical representation of the various ignition lock cylinder and corresponding solenoid states in accordance with the present invention.

FIG. 4 iillustrates an actuation detection circuit in accordance with the present invention.

FIG. 5 illustrates control and response signals at various system circuit points of a portion of a system according to the present invention.

DETAILED DESCRIPTION OF THE DRAWINGS

Figure 1:
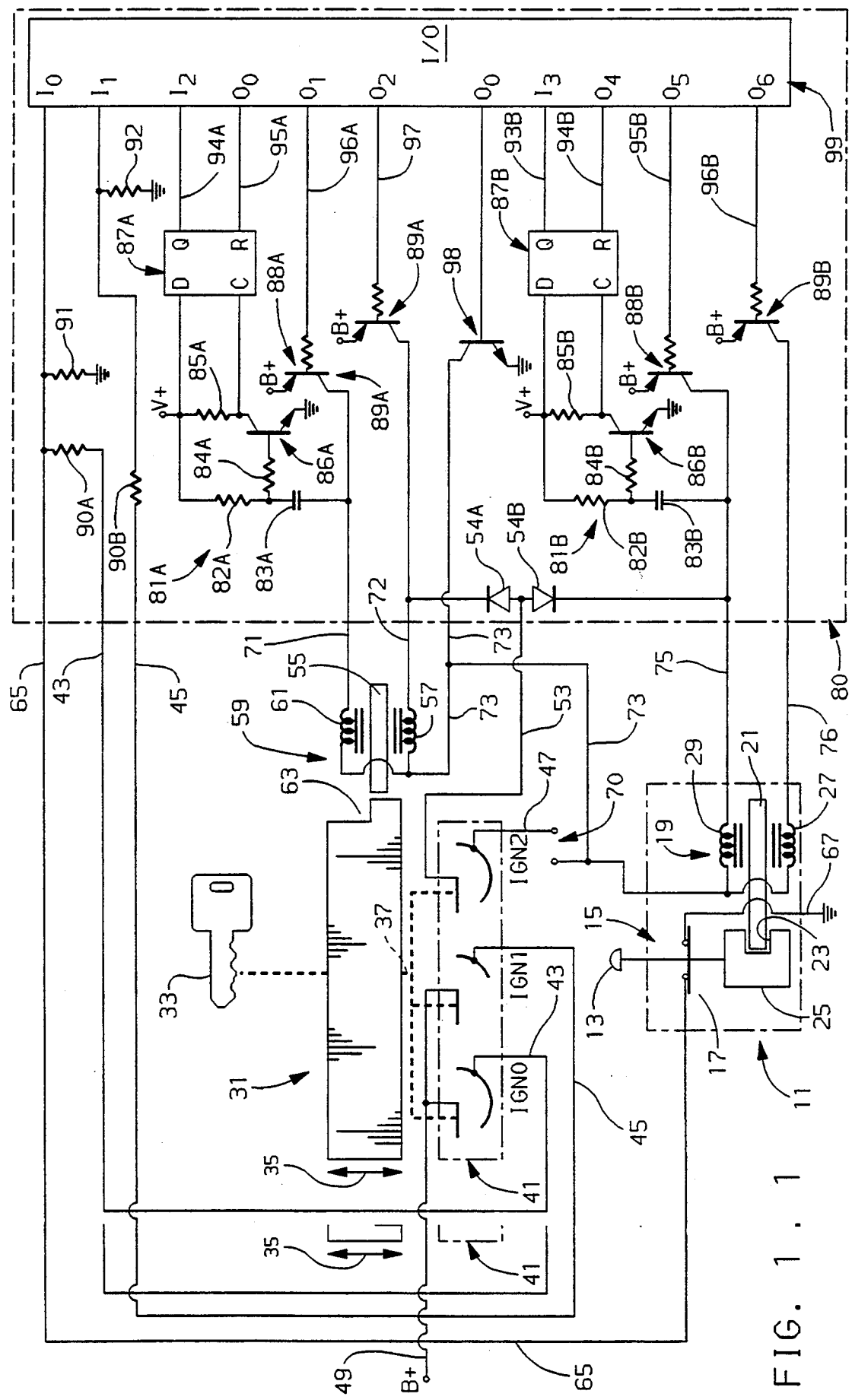
FIG. 1 a system diagram of an ignition lock cylinder and gear shift lever interlock system for an automatic or manual transmission or transaxle equipped motor vehicle in accordance with the present invention.

Referring first to FIG. 1, an exemplary embodiment of the present invention of an ignition lock cylinder and gear shift lever interlock system is illustrated. The figure is representative of a system built around utilization in a motor vehicle being equipped with a center console mounted gear shift lever for either an automatic or manual transmission or transaxle (hereinafter automatic or manual). Shifter assembly 11 is functionally illustrated with respect to the shift inhibit functions related to the invention. Gear shift lever 13 represents, in the case of an automatic, any of a well known variety of mechanical means comprising a button or other mechanical actuator (hereinafter shifter button) necessarily actuated by the vehicle operator in order to move the gear shift lever from the park position to any of the desired other gear positions. In the case of a manual, gear shift lever 13 represents a conventional gear shift lever and does not have any such shifter button associated therewith. Gear shift lever 13 is shown in the park position (park for automatic and reverse for manual). Park switch 15 is shown communicating with gear shift lever such that actuation of the shifter button (automatic) or movement of the gear shift lever out of the park position causes park switch 15 to open by virtue of moving contact 17. Park switch 15 closed contacts couple line 65 to ground reference via line 67. Also shown associated with gear shift lever assembly 11 is bi-stable solenoid 19 having plunger 21, shift inhibit coil (SIC) 27 and shift enable coil (SEC) 29. Gear shift lever 13 linkage 25 has a shift inhibit pocket 23 for accepting the plunger. Preferably, bi-stable solenoid 19 is of the magnetically latching type well known in the art. Each coil 27,29 when energized is effective to move the plunger in one of two linear directions and the magnetic properties of plunger 21 effectuates latching of the solenoid into the last commanded position. Plunger 19 can travel between a full left position as illustrated or a full right position. The full left position of plunger 19 engages gear shift lever linkage 25 such that movement of the gear shift lever is inhibited by virtue of inhibiting the shifter button (automatic) or gear shift lever directly (manual). Although illustrated herein as pocket 23 receiving plunger 19, any adequate motion inhibiting means employing different mechanical blocking corresponding to one of the two solenoid states is contemplated by the present invention, it being understood that the illustrated gear shift lever assembly 11 is functionally representative of the gear shift lever lockout functions associated with solenoid 19.

Ignition lock cylinder 31 is likewise functionally illustrated in FIG. 1. Ignition lock cylinder 31 functions in ways well known to those skilled in the art to rotate through various positions when key 33 is inserted therein. The conventional rotational motion has been, in the illustration, supplanted by linear motion 35 for clarity of illustration. Insertion and removal of key 33 is possible only when ignition lock cylinder 31 is in an OFF/LOCK position (illustrated), and ignition lock cylinder 31 is operational only when key 33 is properly inserted. Ignition lock cylinder 31 is mechanically linked 37 to ignition switch 41 which is used to make and break circuits in accordance with the position of ignition lock cylinder 31 rotation for cranking the vehicle engine, powering a running engine, powering various vehicle accessories and electrical equipment, and shutting the vehicle down. Ignition switch 41 comprises three sets of contacts labeled IGN0, IGN1 and IGN2 coupled to lines 43, 45 and 47 respectively.

In the present embodiment, ignition lock cylinder 31 comprises an OFF/LOCK position whereat ignition switch 41 powers no vehicle functions as illustrated or, at most, may power certain vehicle parasitic loads necessary for various control unit memory keep alive functions, none of which are illustrated for the sake of clarity. Ignition lock cylinder 31 further comprises an accessory "ACC" position, RUN position and CRANK position, all of which are well known in the art. Ignition switch 41 is functionally illustrated with relation only to the ignition lock cylinder and gear shift lever interlock system of the present invention.

Figures 2, 3A, 3B, 3C:
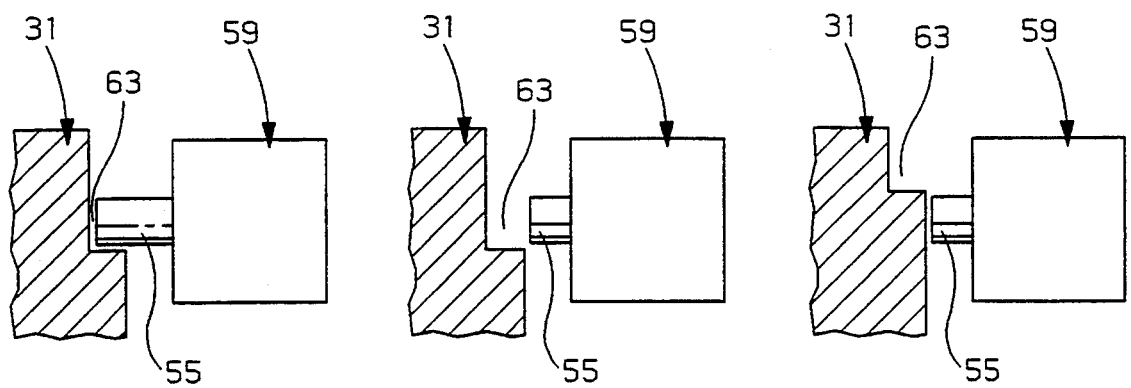
FIG. 2 shows a state chart for various ignition switch contacts at various ignition lock cylinder positions.

The state table illustrated in FIG. 2 indicates various switch states for ignition switch contacts IGN0, IGN1 and IGN2 in accordance with ignition lock cylinder 31 position. A zero (0) state represents open contacts and a one (1) state represents closed contacts. From the state table and FIG. 1 schematic illustration of ignition switch 41 it can be seen that line 43 is coupled through IGN0 contacts to vehicle system voltage B+ line 49 in ACC, RUN and CRANK, and line 45 is coupled through IGN1 contacts to system voltage B+ line 49 in RUN and CRANK. Likewise, it can be seen that override voltage line 47 is coupled through IGN2 contacts to line 53 in ACC, RUN and CRANK. IGN0 and IGN1 contacts are used in relation to normal operation of the system and IGN2 contacts are used to override the system in the event of a run-down battery or other electrical system failure discussed at a later point. Also, relative to the present embodiment, IGN0, IGN1 and IGN2 contact states are identical in both RUN and CRANK positions of the ignition lock cylinder and as such only the RUN position will be discussed herein with the understanding that the CRANK position provides for the same results.

Ignition lock cylinder 31 is further illustrated mechanically communicating with bi-stable solenoid 59 having plunger 55 and lock inhibit coil (LIC) 57 and lock enable coil (LEC) 61. Ignition lock cylinder 31 has a lock inhibit ledge 63 for interference with plunger 55. FIGS. 3A–3C are functionally illustrative of solenoid 59 states in combination with ignition lock cylinder 31 lock inhibit ledge 63. FIG. 3A shows plunger 55 of solenoid 59 in the lock inhibit state whereby ignition lock cylinder 31 is in ACC and inhibited from moving to OFF/LOCK (upward as illustrated) due to interference of plunger 55 with lock inhibit ledge 63. FIG. 3B shows plunger 55 of solenoid 59 in the lock enable state with ignition lock cylinder 31 still in ACC but now free to move to upward to OFF/LOCK without interference between plunger 55 and lock inhibit ledge 63. Finally, FIG. 3C shows plunger 55 of solenoid 59 in the lock enable state with ignition lock cylinder 31 in OFF/LOCK.

Preferably, bi-stable solenoid 59 is also of the magnetically latching type well known in the art. Each coil 57,61 when energized is effective to move the plunger in one of two linear directions and the magnetic properties of plunger 55 effectuates latching of the solenoid into the last commanded position. Plunger 55 can travel between a full right position as illustrated or a full left position. The full left position of plunger 55 interferes with ledge 63 such that movement of the ignition lock cylinder into the OFF/LOCK position is inhibited. Although illustrated herein as ledge 63 interfering with plunger 55, any adequate motion inhibiting means employing different mechanical blocking corresponding to one of the two solenoid states is contemplated by the present invention, it being understood that the illustrated arrangement is functionally representative of the ignition lock cylinder lockout functions associated with solenoid 55.

Assuming an initial system state as illustrated where gear shift lever 13 is in the park position, then ignition lock cylinder 31 is in OFF/LOCK, solenoid 19 is in the shift inhibit state, solenoid 59 is in the lock enable state and gear shift lever 13 is thereby inhibited from movement out of the park position. However, ignition lock cylinder is free to accept key 33 and rotate to any position. Assuming rotation of ignition lock cylinder 31 to the ACC position, no change in the state of either solenoid 19, 59 occurs and gear shift lever 13 remains inhibited from movement out of the park position while ignition lock cylinder 31 remains rotatable to any available position including OFF/LOCK where the key may be removed.

Assuming rotation of ignition lock cylinder 31 to the RUN position, solenoid 59 is caused to change its state through energization of LIC 57. Plunger 55 moves to the lock inhibit state and is latched in position to impede rotation of ignition lock cylinder beyond ACC to LOCK/OFF. With ignition lock cylinder 31 still in the RUN position, solenoid 19 is next caused to change its state through energization of SEC 29. Plunger 21 moves to the shift enable state and is latched in position to enable movement of gear shift lever 13 out of the park position. Preferably, if for some reason solenoid 59 does not assume the lock inhibit state to inhibit ignition lock cylinder 31 from returning to OFF/LOCK, then SEC 29 will not be energized and gear shift lever 13 remains inhibited from movement out of the park position. Of course, in this scenario, ignition lock cylinder is free to rotate to OFF/LOCK whereat key 33 can be relinquished.

Assuming that ignition lock cylinder 31 is in the RUN position, plunger 55 is in the lock inhibit state, plunger 21 is in the shift enable state, then gear shift lever 13 is thereby enabled to move out of the park position and among the various other available positions. Ignition lock cylinder 31 is able to rotate to the ACC position unimpeded, however, it is inhibited from rotating beyond ACC to OFF/LOCK until certain conditions are met. Until gear shift lever 13 is properly returned to the park position and shifter button released, the current solenoid states will be maintained and the ignition lock cylinder is prevented from returning to the OFF/LOCK position thereby retaining the ignition key therein. When gear shift lever 13 is returned to the park position, shifter button released and the ignition lock cylinder is contemporaneously, even transiently, in the ACC position, then solenoid 19 is caused to change its state through energization of SIC 27. Plunger 21 moves to the shift inhibit state and is latched in position to inhibit movement of gear shift lever 13 out of the park position. With ignition lock cylinder 31 still in the ACC position, solenoid 59 is next caused to change its state through energization of LEC 61. Plunger 55 moves to the lock enable state and is latched in position to enable movement of ignition lock cylinder 31 to OFF/LOCK. Preferably, if for some reason solenoid 19 does not assume the shift inhibit state to inhibit movement of gear shift lever 13 out of the park position, then LEC 61 will not be energized and ignition lock cylinder 31 remains inhibited from movement into OFF/LOCK. Of course, in this scenario, gear shift lever 13 remains free to move among the various available positions.

Override of the system in the event of an electrical failure or run-down of the vehicle battery is desirable. If it is necessary to tow the vehicle for example, it may be necessary to select a neutral gear position. Similarly, if it is necessary to move the vehicle manually then it is necessary to select a neutral gear position. It is possible to provide mechanical overrides for the present system, however, the preferred override is provided electrically without the expense of significant hardware. With the ignition lock cylinder in the ACC or RUN position, the LIC 57 and SEC 29 can be energized from an external DC power source via override terminal pair 70. Coupling the positive terminal of an external DC power source to the one terminal of override terminal pair coupled to line 47 and the negative terminal thereof to the other terminal of the override terminal pair coupled to lines 73 will energize the two solenoid coils via IGN2 closed contact, line 53, respective blocking diodes 54A and 54B and respective energization lines 72 and 75. Polarity reversal of the external DC power source will not effectuate any change in the solenoid states since the blocking diodes prevent current passage to either coil. Blocking diodes are illustrated as part of controller 80 discussed below.

Controller 80 is preferably a microcomputer based controller having internal CPU, RAM, ROM, clock and input/output (I/O) circuitry associated therewith for running a series of repetitive pre-programmed instructions stored in ROM for carrying out the monitoring and control functions of the present invention. I/O 99 is illustrated having a plurality of binary digital input ports I0–I3 and binary digital output ports O0–O6. High and low states correspond substantially to system voltage B+ (labeled V+internal the controller) and ground references respectively. The states of contacts IGN0, IGN1 and park switch 15 are monitored by controller 80 at I0 and I1. I0 reads a low state any time park switch 15 is closed because the port will be coupled to ground reference via lines 65 and 67. With park switch 15 open and ignition lock cylinder 31 in OFF/LOCK, I0 will read a low state since lines 65 and 43 are pulled low by resistor 91. However, with park switch 15 open and ignition lock cylinder 31 in ACC or RUN, I0 will read a high state since line 43 is now coupled to system voltage B+ and I0 is coupled thereto via current limiting resistor 90A. I1 will read a high state with ignition lock cylinder in RUN since I1 is coupled to B+ via line 45 and current limiting resistor 90B. I1 will read a low state with ignition lock cylinder 31 in OFF/LOCK since line 45 is now floating and I1 is coupled to ground reference via pulldown resistor 92.

The solenoid states are controlled by controller 80 at O1–O3, O5 and O6. The preferred magnetically latching solenoids need only be pulse energized to actuate the plungers since thereafter assuming the commanded position the magnetic latching provides state stability. A controlled common ground path for energization of all solenoid coils comprises lines 73 and driver 98. Driver 98 includes a switching transistor and biasing resistor effective to couple lines 73 to ground upon output of a high state on line 97 from O3. O3 is normally at a low state and switches to a high state only when a solenoid is to be energized. All solenoids are energized independently and in the same fashion using respective energization lines 71, 72, 75 and 76 and corresponding drivers 88A, 89A, 88B and 89B. Taking solenoid 59 LEC 61 as an example, energization thereof is caused to occur by output port O3 outputting a high state to provide ground to LEC 61 and output port O1 switching from its normally high state to a low state. The a low state outputted to line 95A causes driver 88A to couple system voltage B+ to line 71 thereby energizing SEC 61 for so long as the zero state is maintained. Drivers 89A, 88B and 89B, output ports O2, O5 and O6 and lines 96A, 95B and 96B operate in the same fashion to energize LIC 57, SEC 29 and SIC 27 respectively.

In accordance with preferred operation whereby one solenoid will not assume an enable state until the other solenoid achieves an inhibit state, it becomes necessary to provide the controller with an indication that the respective inhibit state has been achieved. One manner of accomplishing this is via a respective state detection means such as a mechanical switch coupled and responsive to the respective lockout means to thereby indicate the inhibit or enable state thereof. In the present embodiment, however, state detection means are advantageously provided without additional mechanical hardware. State detection means comprise actuation detection circuits 81A and 81B incorporated within controller 80 for detecting motion of plungers 55 and 21 respectively into the inhibit positions. In general, actuation detection circuits 81A & 81B are used to detect voltage induced in the respective LEC 61 and SEC 29 by plunger movement caused by energization of the respective LIC 57 and SIC 27. Plungers 55 and 21 carry magnetic flux from a permanent magnet in the solenoid assembly and the movement of the plunger is effective to induce a voltage in the respective coils of the solenoids.

Referring now to FIG. 4, actuation detection circuit 81A is provided in detail apart from other details of FIG. 1. Circuit 81A is used to detect the motion of plunger 55 when it is commanded into the lock inhibit position through energization of LIC 57. Circuit 81A is exemplified herein with the understanding that circuit 81B functions in the same fashion as described but with respect to solenoid 19. Elements 82B–87B, 93B and 94B correspond respectively to elements 82A–87A, 93A and 94A as herein described. References to FIGS. 5A–5E below certain lines are made to illustrate operation of the actuation detection circuit.

Assuming an initial stable state prior to time t0 wherein plunger 55 is magnetically latched in the lock enable position, lines 95A and 96A are held high by output ports O1 and O2. Drivers 88A and 89A are therefore biased off and lines 71 and 72 are at ground reference. The clock input C to flip-flop 87A is coupled to the collector of transistor 86A. Since steady state is assumed, transistor 86A is biased on via resistors 82A, 84A and 85A and DC blocking capacitor 83A thereby coupling clock input C of flip-flop 87A substantially to ground potential. The Q output of flip-flop 87A on line 93A to input port I2 is assumed high although its state at time prior to t0 is not particularly relevant as will be seen. Line 94A is held low by output port O0 thereby providing ground reference to reset input R of flip-flop 87A.

At time t0, LIC 57 is energized by output port O2 holding line 96A low thereby switching driver 89A on and coupling line 72 to system voltage B+. The changing current therethrough LIC 57 induces a changing magnetic field which is coupled to LEC 61 and results in an induced voltage thereacross which is negative at line 71 with respect to the ground reference as illustrated in FIG. 5D. Transistor 86A is biased off since the common node between resistors 82A and 84A is AC coupled to the negative voltage on line 71 and clock input C is pulled up to a high logic level. Contemporaneously, output port O0 pulses line 94A and reset input R of flip-flop 87A high. Without the reset pulse, the rising edge of the voltage signal at clock input C would cause the Q output to assume the logic state then present at the D input of the flip-flop. The reset pulse effectively sets the output Q to a low state which will remain such until the next rising edge of a voltage signal at C. Eventually, as the current through LIC 57 stabilizes and reaches steady state, so too does the magnetic field coupled to LEC 61 and the induced voltage thereacross decays positively toward zero at line 71 with respect to the ground reference as illustrated in FIG. 5D. Transistor will become biased on again thereby holding clock input C to ground reference.

Actuation detection circuit 81A is now poised to detect motion of plunger 55 into the lock inhibit position. Plunger motion at time t1 causes a magnetic flux change through LEC 61 effective to induce a voltage thereacross which is negative at line 71 with respect to the ground reference as illustrated in FIG. 5D. Once again, transistor 86A is biased off and clock input C is pulled up to a high logic level, the rising edge of the voltage signal thereat latching the Q output at the logic state present at the D input of the flip-flop. Since no reset pulse is output onto line 94A during the current sequence, the Q output remains high. Between times t1 and t2, the voltage appearing at line 71 as illustrated in FIG. 5D can be seen to undergo several such induced voltage instances which cause corresponding clock pulses as illustrated in FIG. 5E. These are the effects of settling of the solenoid plunger similar to switch contact bounce in mechanical switches. They do not detrimentally effect the operation of the circuit since the clock pulses will merely latch in the current state at the D input of the flip-flop which is tied to high logic level voltage V+. Additionally, as can be seen at time t2, output port O2 reverts to its normally high state thereby causing a decay in the current through LIC 57 and the magnetic field coupled to LEC 61. This induces a voltage thereacross which is positive at line 71 with respect to the ground reference as illustrated in FIG. 5D. This has no effect upon the positively biased transistor 86A and consequently does not cause any clock pulse at the flip-flop.

Specifically with reference to FIGS. 5A–5F, the actual time associated with the various voltage signals are a function of the solenoid response characteristics and magnetic properties. In the present exemplary embodiment, the energization command for SIC 57 shown in FIG. 5B has a duration of approximately 25 ms, which time is sufficient for actuation of the solenoid plunger from the magnetically latched lock enable position to the magnetically latched lock inhibit position. Induced voltage across LEC 61 shown in FIG. 5D has transient responses and decays associated predominantly with the reactive solenoid coils and magnetic permeability of the plunger. The time t0–t1 which represents the time between initiating energization of LIC 57 and plunger motion can be expected to vary between different solenoid designs and among solenoids of the same design. One bi-stable magnetically latching solenoid design implemented in carrying out the present invention yielded such response time varying from about 5 ms to 15 ms. It is only necessary for the purpose of ensuring a stable reset of the flip-flop state that the characteristic response time of the solenoid not be less than the time it takes to reset the flip-flop and otherwise initialize the actuation detection circuit.

The Q output of flip-flop 87A on line 93A input to input port I2 is the signal monitored for detecting actuation. Once the output has been reset to a low state at the beginning of the sequence as described, it will only transition to a high state if the clock input C of flip-flop 87A receives the rising edge of a voltage signal. This will only occur via motion of the plunger and absent plunger motion the clock pulses as characteristically illustrated between times t1 and t2 will not occur and output Q will remain low thus indicating failed actuation of the plunger. The state of the Q output is sampled in a diagnostic window between time t2 and t3 by the controller to establish its state as an indication of the actuation of the plunger. Time t2 as illustrated corresponds substantially to the end of the energization command output at output port O2 and has a duration of substantially 10 ms in the present embodiment.

Figure 6:
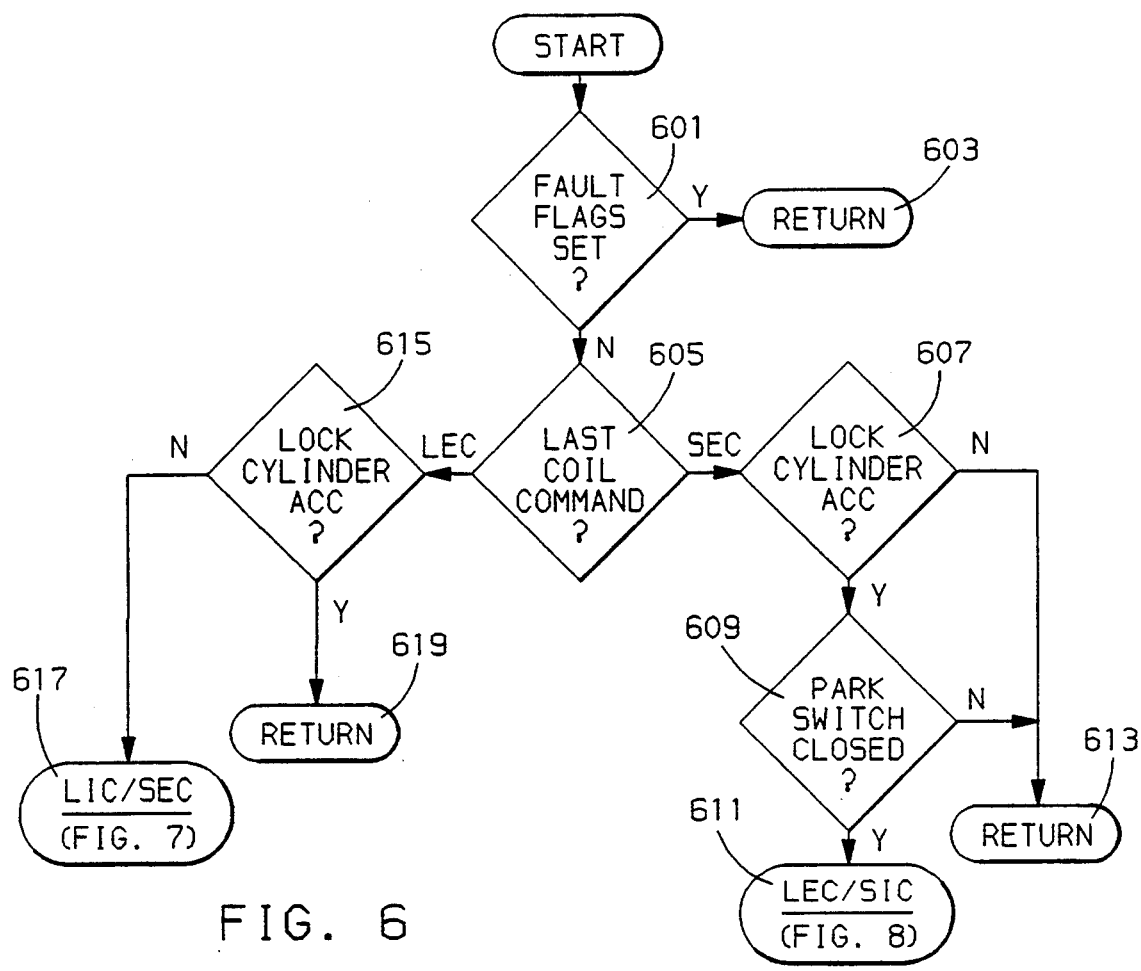
FIGS. 6–8 are algorithm steps representative of program instruction implemented in carrying out the interlock functions performed by the system of FIG. 1 via computer control in accordance with the present invention.
Figure 7:
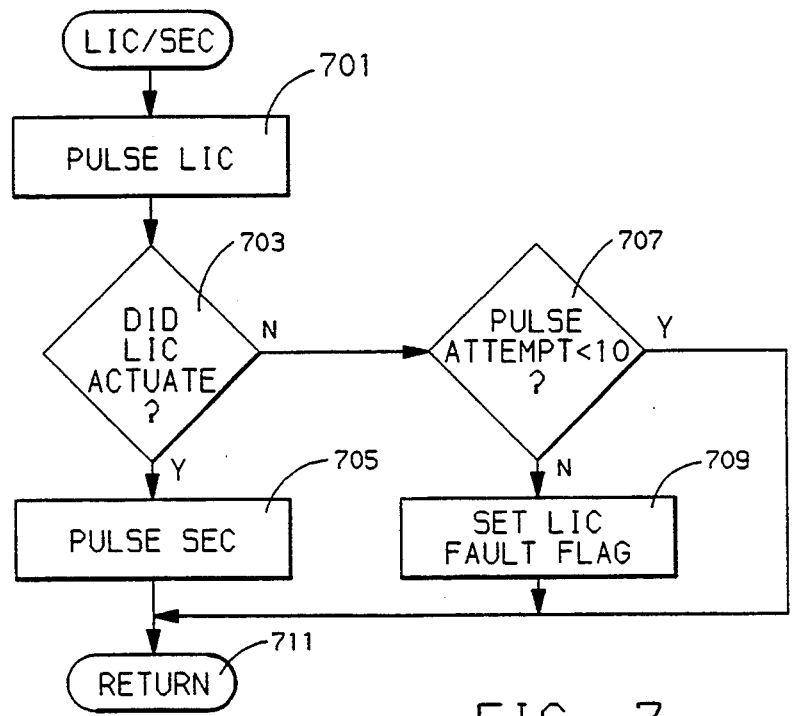
Figure 8:
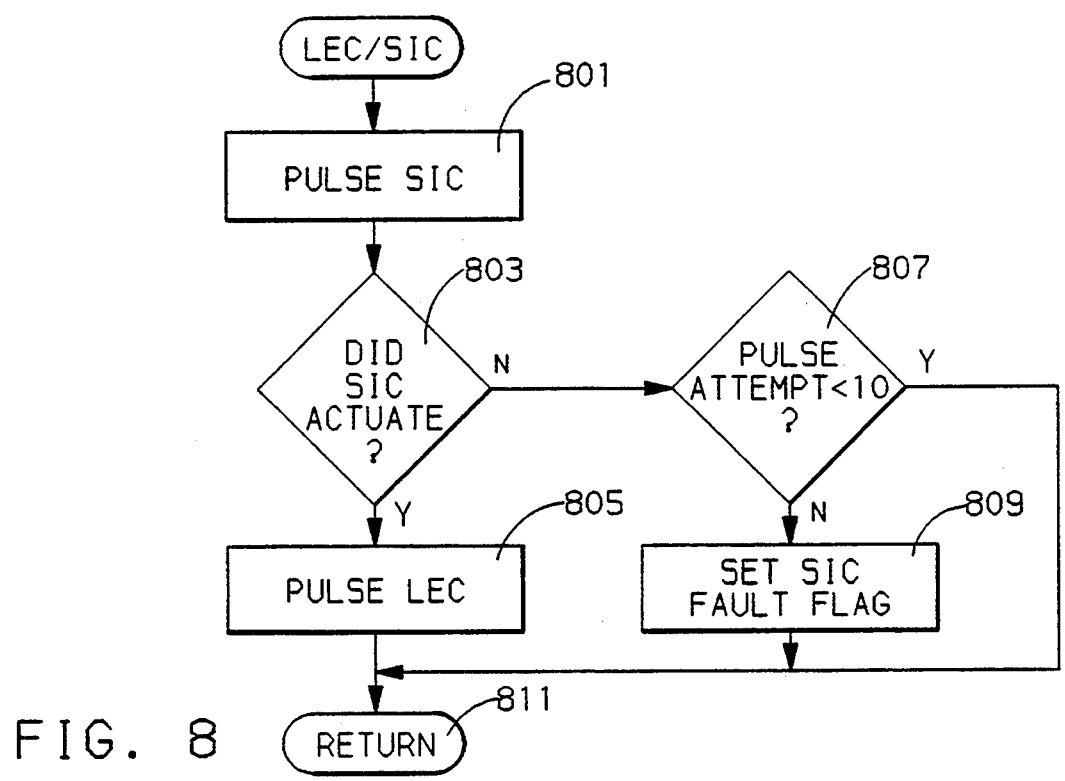

Referring now to FIGS. 6–8, a set of steps executable by the controller for carrying out the present invention are illustrated. The control steps are executed at regular intervals and may be part of a larger set of instructions executed for controlling other functions not related to the immediate ignition lock cylinder and gear shift lever interlock system. Preferably, a background program controls the execution of the control steps and performs various routine initialization, diagnostic, data acquisition and conditioning, and output functions. Such background programs are well known to those skilled in the art and therefore are not illustrated herein.

Beginning with FIG. 6 and block 601, certain fault flags are preferably checked to determine if a system fault has been detected on a previous pass through the set of control instructions. If any faults were detected, execution of the remaining control steps is suspended and return to the background program is effectuated as shown by block 603. Where no fault flags have been set, control passes to block 605 whereat a determination is made as to what state the interlock system is in. If the last coil command was energization of LEC 61, then block 615 is next executed. Alternatively, if the last coil command was energization of SEC 29, then block 607 is next executed.

Taking the situation where LEC 61 was last executed, it is known that SIC 27 successfully actuated plunger 21 to prevent movement of the shift lever out of the park position. The state of the ignition lock cylinder is checked at block 615 and if in ACC, the states of the solenoids are proper at lock enable and shift inhibit and the background program is returned via block 619. If it is determined at block 615 that the ignition lock cylinder is not in ACC, then it is assumed it is in RUN and the desired solenoid states are lock inhibit and shift enable. Therefore, block 617 is executed to energize LIC 57 and SEC 29.

Taking next the situation where, at block 605, it was determined that SEC 29 was last executed, it is known that LIC 57 successfully actuated plunger 55 to prevent movement of the ignition lock cylinder to OFF/LOCK. The state of the ignition lock cylinder is checked at block 607 and if not in ACC it is assumed it is in RUN and the states of the solenoids are proper at lock inhibit and shift enable, and the background program is returned via block 613. If it is determined at block 607 that the ignition lock cylinder is in ACC, then it is determined at block 609 if the shift lever is in the park position by checking the state of the park switch. If the park switch is not closed then the shift lever is known to be out of the park position or in the park position with the shifter button depressed. In either case the states of the solenoids are proper at lock inhibit and shift enable and the background program is returned via block 613. If at block 609 it is determined that the shift lever is properly in the park position with the shifter button not depressed, then the desired solenoid states are lock enable and shift inhibit since the ignition lock cylinder is also known to be in ACC. Therefore, block 611 is executed to energize LEC 61 and SEC 29.

Referring now to FIG. 7, steps for controlling the solenoid states to inhibit the ignition lock cylinder and enable the gear shift lever are illustrated. Block 701 commands the energization of LIC 57 and block 703 determines if plunger 55 actuated. Where successful actuation has occurred the ignition lock cylinder is inhibited from returning to OFF/LOCK, and block 705 is executed to command the energization of SEC 29. The background program is then returned via block 711. Where actuation has failed, block 707 determines if the actuation has been attempted less than ten (10) times. If the number of attempted actuations is less than ten, then block 711 returns to the background program and another attempted actuation will occur on the next pass through the control steps. If it is determined at block 707 that the attempted actuation was the tenth such attempt, then a fault flag is set indicating failed actuation of plunger into the lock inhibit state. It is here noted that the block 705 will command energization of SEC 29 only when successful actuation of the plunger into the lock inhibit state is verified.

Referring now to FIG. 8, steps similar to those in FIG. 7 for controlling the solenoid states are illustrated. Here, however, the steps are performed to enable the ignition lock cylinder and inhibit the gear shift lever. Block 801 commands the energization of SIC 27 and block 803 determines if plunger 21 actuated. Where successful actuation has occurred the gear shift lever is inhibited from moving out of the park position, and block 805 is executed to command the energization of LEC 61. The background program is then returned via block 811. Where actuation has failed, block 807 determines if the actuation has been attempted less than ten (10) times. If the number of attempted actuations is less than ten, then block 811 returns to the background program and another attempted actuation will occur on the next pass through the control steps. If it is determined at block 807 that the attempted actuation was the tenth such attempt, then a fault flag is set indicating failed actuation of plunger into the shift inhibit state. It is here noted that the block 805 will command energization of LEC 61 only when successful actuation of the plunger into the shift inhibit state is verified.

While the invention described herein has been set forth with relation to certain preferred and exemplary embodiments, it is understood that any number of variations may be apparent in implementing the invention, and that the scope of the invention is to be limited only to the scope of the appended claims and not by any limitations implied from the detailed description given herein.

The embodiments of the invention in which an exclusive property or privilege is claimed are defined as follows:

1. In a motor vehicle having an ignition lock cylinder with a lock position, run position and an intermediate position therebetween, and a gear shift lever with a park position and a plurality of selectable gear positions, an ignition lock cylinder and gear shift lever interlock system comprising in combination:

ignition lock cylinder lock-out means having a lock inhibit state for preventing the lock cylinder from entering the lock position and a lock enable state for allowing the lock cylinder to enter the lock position;

gear shift lever lock-out means having a shift inhibit state for preventing the gear shift lever from exiting the park position and a shift enable state for allowing the gear shift lever to exit the park position;

means responsive to the ignition lock cylinder in the run position for commanding the ignition lock cylinder lock-out means to the lock inhibit state and the gear shift lever lock-out means to the shift enable state;

means responsive to the ignition lock cylinder in the intermediate position for commanding the gear shift lever lock-out means to the shift inhibit state and the ignition lock cylinder lock-out means to the lock enable state.

2. An ignition lock cylinder and gear shift lever interlock system as claimed in claim 1 further comprising state detection means for said ignition lock cylinder lock-out means wherein the gear shift lever lock-out means is only commanded to the shift enable state after the ignition lock cylinder lock-out means is in the lock inhibit state.

3. An ignition lock cylinder and gear shift lever interlock system as claimed in claim 1 further comprising state detection means for said gear shift lever lock-out means wherein the ignition lock cylinder lock-out means is only commanded to the lock enable state after the gear shift lever lock-out means is in the shift inhibit state.

4. An ignition lock cylinder and gear shift interlock system as claimed in claim 1 further comprising park position detection means wherein the ignition lock cylinder lock-out means is only commanded to the lock enable state if the gear shift lever is in the park position.

5. An ignition lock cylinder and gear shift lever interlock system as claimed in claims 2 or 3 wherein each of said lock-out means comprises a bi-stable solenoid having a pair of coils and a plunger, each of said coils being energizable exclusive of the other to move the plunger into one of two positions corresponding to one of the inhibit and enable states of the corresponding lock-out means.

6. In a motor vehicle having an ignition lock cylinder with a lock position, run position and an intermediate position therebetween, and a gear shift lever with a park position and a plurality of selectable gear positions, an ignition lock cylinder and gear shift lever interlock system comprising in combination:

control means;

ignition lock cylinder lock-out means comprising a first bi-stable solenoid having first and second coils and a corresponding plunger, said corresponding plunger having a first position established through energization of said first coil and a second position established through energization of said second coil, said ignition lock cylinder lock-out means further having a lock inhibit state corresponding to the first position of said corresponding plunger for preventing the lock cylinder from entering the lock position and a lock enable state corresponding to the second position of said corresponding plunger for allowing the lock cylinder to enter the lock position;

gear shift lever lock-out means comprising a second bi-stable solenoid having first and second coils and a corresponding plunger, said corresponding plunger having a first position established through energization of said first coil and a second position established through energization of said second coil, said gear shift lever lock-out means further having a shift inhibit state corresponding to a first position of said corresponding plunger for preventing the gear shift lever from exiting the park position and a shift enable state corresponding to a second position of said corresponding plunger for allowing the gear shift lever to exit the park position;

said control means responsive to the ignition lock cylinder in the run position for energizing the first coil of the first solenoid to actuate the corresponding plunger to the first position and thereafter energizing the second coil of the second solenoid to actuate the corresponding plunger to the second position; and said control means responsive to the ignition lock cylinder in the intermediate position for energizing the first coil of the second solenoid to actuate the corresponding plunger to the first position and thereafter energizing the second coil of the first solenoid to actuate the corresponding plunger to the first position.

7. An ignition lock cylinder and gear shift lever interlock system as claimed in claim 6 further comprising:

respective state detection means for each of said lock-out means; and said control means further responsive to said respective state detection means to energize the second coil of the second solenoid only after the lock inhibit state has been achieved by the ignition lock cylinder lock-out means and to energize the second coil of the first solenoid only after the shift inhibit state has been achieved by the gear shift lever lock-out means.

* * * * *

UNITED STATES PATENT AND TRADEMARK OFFICE
CERTIFICATE OF CORRECTION

PATENT NO. : 5,445,575
DATED : Aug. 29, 1995
INVENTOR(S) : Arthur R. Sundeen, James C. Byrne It is certified that error appears in the above-identified patent and that said Letters Patent is hereby corrected as shown below:

On the title page: Item

(76) Inventor: should read as follows

-- Inventors: Arthur R. Sundeen, Lansing; James C. Byrne, Farmington Hills, both of Mich. --

Signed and Sealed this

Twenty-first Day of November, 1995

*Attest:*

BRUCE LEHMAN

*Attesting Officer*     *Commissioner of Patents and Trademarks*